April 24, 1956  F. M. MOTT ET AL  2,742,987
CONTROL MECHANISM FOR THE TRANSMISSON SYSTEMS OF MOTOR VEHICLES
Filed April 9, 1954  2 Sheets-Sheet 1
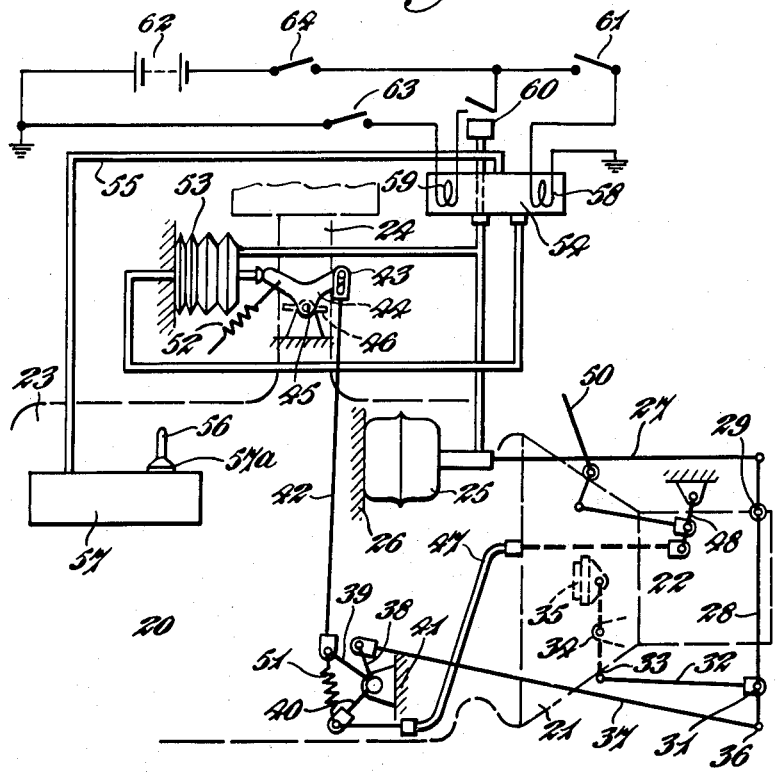
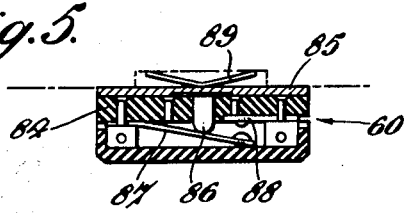

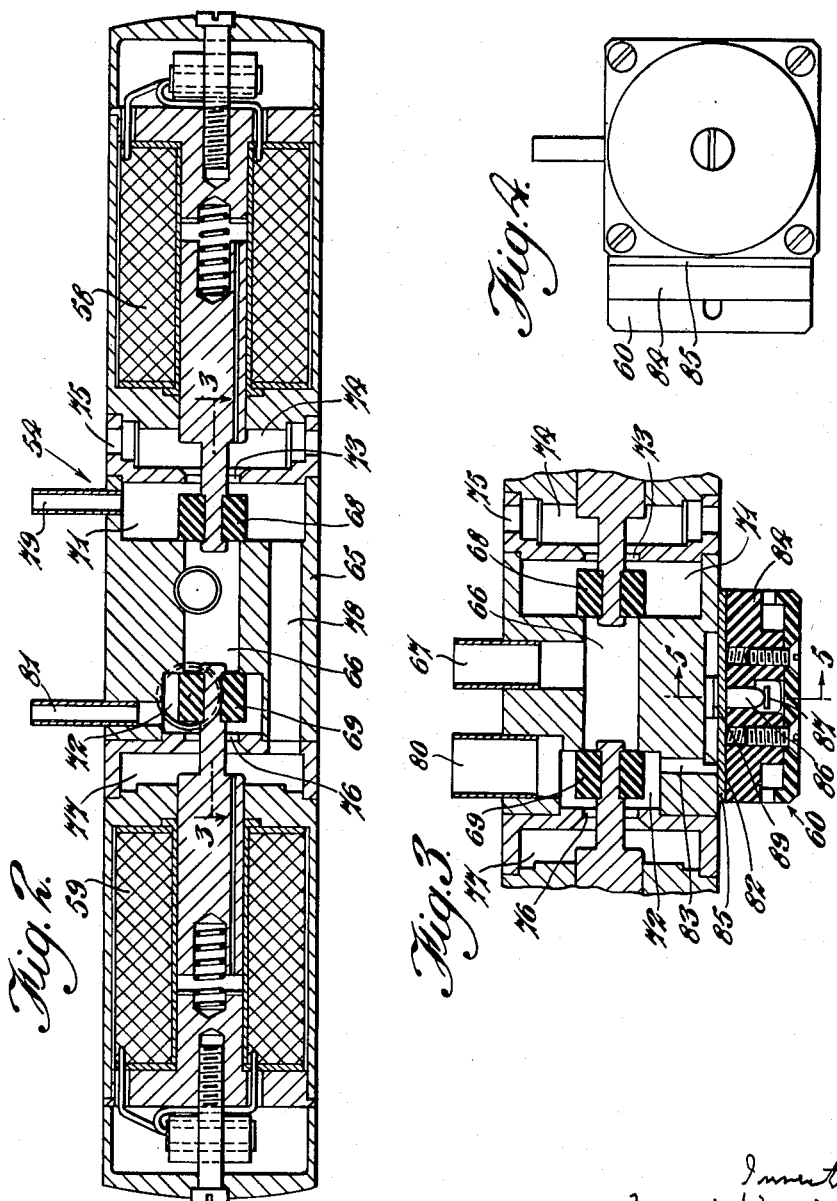

United States Patent Office  2,742,987
Patented Apr. 24, 1956

2,742,987

CONTROL MECHANISM FOR THE TRANSMISSION SYSTEMS OF MOTOR VEHICLES

Frederick Marlow Mott and Frederick James Bradbury, Leamington Spa, England, assignors to Automotive Products Company Limited, Leamington Spa, England Application April 9, 1954, Serial No. 422,208

2 Claims. (Cl. 192—.08)

This invention relates to control mechanism for the type of transmission system of motor vehicles which comprises a variable speed gear-box having a plurality of constant mesh gear trains selectively brought into action by the engagement of positive clutches, the mating elements of the said clutches being brought to the same or substantially the same speed prior to engagement by friction means; and a friction clutch through which the power is transmitted from the engine to the gear-box.

Our copending U. S. patent application, Serial No. 271,606, filed February 14, 1952, discloses a control mechanism for a motor vehicle transmission system of the type set forth in the preceding paragraph, comprising a movable member which effects directly the engagement and disengagement of the positive clutches in the gear-box, servo means controlled by said movable member and acting to disengage the friction clutch, and means sensitive to relative rotation of the driving and driven members of the friction clutch for holding the said clutch disengaged and at the same time adjusting the engine throttle to vary the speed of the driving member, said means permitting re-engagement of the friction clutch only on the establishment of a predetermined speed relation between the driving and driven members of the said clutch, said control mechanism being characterized by the fact that servo means constituted by the servo means acting to disengage the friction clutch or other servo means operable simultaneously therewith act to limit the opening of the engine throttle during a gear change.

The words "effects directly" in the foregoing paragraph mean that the movable member is connected to the gear-box shift mechanism by a mechanical linkage or liquid pressure system which transmits the movement of the member positively to said mechanism, as distinct from merely actuating a switch, valve or the like controlling a servo-motor.

In the system specifically described in the above mentioned copending application, a vacuum servo-motor which, when energised, acts to disengage the clutch, is energised when the movable member is moved to disengage a gear, by the action of a solenoid-operated valve, a solenoid for operating the valve being energised by the closure of contacts in an electric switch actuated by the said movable member, a second vacuum servo-motor being simultaneously operated to move into operative position a stop limiting the opening of the engine throttle.

Upon engagement of another gear, the contacts closed upon disengagement of the previously engaged gear are re-opened, but other contacts in the same switch are closed, these latter contacts being in a circuit including a second solenoid associated with the solenoid operated valve, a switch closed mechanically by the release of the clutch, and a relay operated switch the relay of which is energised by the closing of contacts associated with the clutch at any time when the clutch is disengaged and the driven member of the clutch is overrunning the driving member. Thus, if the driven member of the clutch is overrunning the driving member when the gear is re-engaged the second solenoid is energised, and the resulting action of the valve maintains operation of the clutch servo-motor to keep the clutch disengaged, and also operates a further servo-motor to move into operative position a further stop acting to open, or limit the closing of, the throttle. The throttle closing stop becomes ineffective when the clutch is re-engaged. The engine is thus speeded up with the clutch disengaged until the driving member of the clutch overruns the driven member, when the relay operated switch is opened, and the servo-motors are de-energised, allowing the clutch to re-engage and freeing the throttle for manual control.

According to the present invention, the control mechanism, as set forth in the above mentioned copending application, comprising a vacuum servo-motor acting to disengage the clutch, mechanical linkage moved by the said vacuum servo-motor to restrict the throttle opening, a second vacuum servo-motor actuating a throttle opening stop to open the throttle, solenoid operated valve means controlling said servo-motors, said means having two operating solenoids one of which is controlled by a switch actuated by the movable member to operate the valve for energising the clutch disengaging servo-motor whilst the other is controlled by switch means sensitive to relative rotation of the clutch driving and driven members to operate the valve in such a way that the clutch disengaging servo-motor remains operative and the second servo-motor is energised when the circuit of the first solenoid is broken, is characterized by the fact that a vacuum operated switch arranged in series with the switch means sensitive to relative rotation of the clutch members is connected to the valve means in common with the clutch actuating servo-motor so as to be closed when the said servo-motor is operative.

The invention is hereinafter described with reference to the accompanying drawings, in which:

Figure 1 is a diagram showing one arrangement of control mechanism according to the present invention;

Figure 2 is a sectional elevation of the solenoid operated control valve shown in Figure 1;

Figure 3 is a partial section on the line 3—3 of Figure 2;

Figure 4 is an end view of the control valve shown in Figure 2; and

Figure 5 is a section on the line 5—5 of Figure 3.

Referring to Figure 1, the engine of a motor vehicle is indicated at 20, the clutch housing at 21, and the gear-box at 22. The inlet manifold of the engine is shown at 23, and the carburetor at 24.

A vacuum servo-motor 25, shown as being mounted on a bracket 26 on the engine 20, acts through a pull rod 27 on a lever 28 pivotally mounted at 29 on the gear-box 22, the lever 28 being pivotally connected at 31 to a link 32 which is pivotally connected at its other end to a clutch throw-out lever 33 mounted on a bracket 34 inside the clutch housing 21, the throw-out lever 33 being connected to a clutch release bearing 35 which acts, in the known manner, on the release levers of a plate-type friction clutch (not shown), to disengage the clutch. It will thus be seen that a pull applied to the pull rod 27 by the servo-motor 25 will release the clutch. Also connected to the lever 28, at 36, is a pull rod 37, the other end of which is pivotally connected to an arm 38 mounted, with two other arms 39 and 40, on a bracket 41 carried by the engine 20. The arm 39 is connected by a pull rod 42, having a slotted head 43 at its upper end, to one arm of a bell-crank lever 44 fixed to the spindle 45 of the throttle valve 46 in the carburettor 24, and the arm 40 is connected, by a Bowden cable 47, to an arm 48 operable through a link 49 by a throttle control pedal 50. The arms 39 and 40 are coupled one to the other by a spring 51 shown as a tension spring, and the arm 38 has a lost motion connection with the arm 39 such that, when the arm 38 is in the position which it takes up when the servo-motor 25 is inoperative, the arm 39 is free to move through an arc sufficient to move the throttle valve through its full range, whereas when the servo-motor 25 is energized to release the clutch, the arm 39 is able to move only a short distance from the throttle-closed position. The connections between the arms 38, 39 and 40 are described more fully in our copending U. S. patent application Serial No. 363,306, filed June 22, 1953.

The bell-crank lever 44 is urged towards the throttle-closed position by a spring 52, and a vacuum servo-motor 53 acts on the second arm of the said lever 44 to urge the throttle valve 46 towards the open position.

The suction for operating the servo-motors 25 and 53 is derived from the inlet manifold 23 of the engine, the operation of the servo-motors being controlled by a solenoid operated valve 54 connected to the manifold 23 through pipes 55, 56 and a vacuum reservoir 57, a non-return valve 57a being provided at the inlet to the vacuum reservoir.

The servo-motor 53 has two chambers, suction in one of which tends to open the throttle valve 46 whilst suction in the other acts in the opposite direction. The former chamber of the servo-motor 53, and the servo-motor 25, have a common connection to the valve 54, and the latter chamber is separately connected to the valve 54. The valve 54 is operated, as described in our application Serial No. 271,606 by two solenoids 58 and 59, energisation of the solenoid 58 connecting both chambers of the servo-motor 53, and the servo-motor 25, to the vacuum reservoir 57, whilst energisation of the solenoid 59 connects only the one chamber of the servo-motor 53, and the servo-motor 25, to the vacuum reservoir.

A switch 61, operated, as described in our aforementioned copending application Serial No. 271,606 by the gear-change lever (not shown) of the vehicle so as to be closed when the said lever is in the neutral position, closes an electric circuit containing the solenoid 58 and a battery 62, so that that solenoid is energised when the gear-change lever is moved to the neutral position, and is de-energised when any gear is engaged.

The solenoid 59 is in an electric circuit including a vacuum-operated electric switch 60 and a switch 63 associated with the clutch of the vehicle, as described in our copending U. S. patent application Serial No. 271,605, filed February 14, 1952, the switch 63 being closed when the driven member of the clutch overruns the driving member, and opened when the driving member overruns the driven member.

The ignition switch of the vehicle is shown at 64, this switch, when open, preventing the completion of a circuit through either of the solenoids 58 and 59.

The vacuum-operated electric switch 60 is so arranged that it is always closed when the vacuum servo-motor 25 is energized.

Referring to Figures 2 to 5 inclusive, 65 is the body of the valve 54, the body being of square cross-section as shown in Figure 4, and having a central bore 66 into which opens a conduit 67 from the vacuum reservoir 57. The bore 66 is normally closed at its ends by valve heads 68 and 69 associated respectively with the solenoids 58 and 59, the valve heads being urged by springs to the positions shown in Figures 2 and 3, in which they close the ends of the bore 66, and being moved by energisation of their respective solenoids to place the ends of the said bore in communication respectively with chambers 71 and 72. A port 73, through which the rod connecting the valve head 68 to the armature of the solenoid 58 extends, provides communication between the chamber 71 and a chamber 74 connected by ports 75 to the atmosphere, and a port 76, through which the rod connecting the valve head 69 to the armature of the solenoid 59 extends, provides communication between the chamber 72 and a chamber 77 connected by a passage 78 to the chamber 74. The valve head 68 closes the port 73 when the solenoid 58 is energised, and the valve head 69 closes the port 76 when the solenoid 59 is energised. A conduit 79 leads from the chamber 71 to that chamber of the servo-motor 53 in which suction acts to oppose opening of the throttle valve, and conduits 80 and 81 lead from the chamber 72 to the servo-motor 25 and to the other chamber of the servo-motor 53 respectively.

The vacuum switch 60 is secured to one side wall of the valve body 65, the said body being recessed at 82 and the recess being connected by a passage 83 to the chamber 72. The vacuum switch 60 comprises a base 84 bolted to the valve body so as to clamp between itself and the said body a flexible diaphragm 85, a pin 86 resting against the diaphragm 85 and passing through an opening in the base 84, and a resilient contact arm 87 co-operating with a fixed contact 88. A spring 89 in the recess 82 acts on the diaphragm 85 and pin 86 to urge the contact arm 87 away from the fixed contact 88, and suction acting in the recess 82 moves the diaphragm and pin to allow the two contacts to engage one another.

When the vehicle is in motion, with a gear engaged, the solenoids 58 and 59 are both de-energised, and both servo-motors are connected to atmosphere through the ports 75, so that they are inoperative. Movement of the gear-change lever to change the gear ratio first of all closes the switch 61 to energise the solenoid 58 and move the valve heads 68, thus cutting off both the chambers 71 and 72 in the valve from atmosphere, and applying suction to the servo-motor 25, both chambers of the servo-motor 53, and the recess 82. The clutch is therefore released, and the vacuum switch 60 closed, but the servo-motor 53 remains inoperative. When the movement of the gear lever has been completed the switch 61 re-opens and de-energises the solenoid 58, so that the valve head 68 returns to its normal position. If the engine speed and the road speed are so related that the driving member of the clutch is turning faster than the driven member, the switch 63 remains open, the servo-motor 25 is de-energised, and the clutch re-engages, but if the driving member of the clutch is turning more slowly than the driven member, the switch 63 closes. The circuit of the solenoid 59 is thus completed, and suction is maintained in the chamber 72 of the control valve to which are connected the servo-motor 25, one chamber of the servo-motor 53, and the recess 82. The clutch is thus held disengaged, and the servo-motor 53 is operated to open the throttle valve and speed up the engine until the driving member overruns the driven member. The switch 63 then opens to de-energise the solenoid 59, and the clutch is re-engaged.

The present invention provides an improvement of the system described in our copending patent application Serial No. 271,606, in that the vacuum switch, being closed only when a gear changing operation is initiated, ensures that the throttle opening stop is not operated by overrunning of the clutch driven member if the clutch is disengaged due to closing of the throttle valve when a gear is engaged.

We claim:

1. In combination with a control mechanism for the friction clutch and engine throttle valve of a motor vehicle responsive to operation of a gear shift member controlling a variable speed gearbox, said control mechanism including a vacuum servo-motor for disengaging the friction clutch, means actuated by the said vacuum servo-motor to restrict the opening of the throttle valve, a throttle opening stop for opening the throttle valve, a second vacuum servo-motor actuating the throttle opening stop to open the throttle valve, solenoid operated valve means controlling said servo-motors, said valve means having two operating solenoids, a switch controlling one of said solenoids and being actuated by the gear shift member to operate the valve for energizing the clutch disengaging servo-motor, switch means controlling the other solenoid and being sensitive to relative rotation of the clutch driving and driven members to operate the valve means so that the clutch disengaging servo-motor remains operative and the second servo-motor is energized when the circuit of the first solenoid is broken; a vacuum operated switch arranged in series with the switch means and connected to the valve means in common with the clutch actuating servo-motor so as to be closed when the said servo-motor is operative.

2. A device as claimed in claim 1, wherein said vacuum operated switch is mounted on the solenoid operated valve means.

References Cited in the file of this patent

UNITED STATES PATENTS

| | | |
|---|---|---|
| 2,294,823 | Andres | Sept. 1, 1942 |
| 2,479,532 | Wemp | Aug. 16, 1949 |
| 2,568,958 | Hey et al. | Sept. 25, 1951 |
| 2,622,711 | Chambonneau | Dec. 23, 1952 |